No. 617,113. Patented Jan. 3, 1899.
E. MARCILLE.
CHUCK.
(Application filed Sept. 12, 1898.)
(No Model.) 2 Sheets—Sheet 1.

Attest
Nora Graham
Ina Graham

INVENTOR
E. MARCILLE.
by L. P. Graham
his attorney

No. 617,113. Patented Jan. 3, 1899.
E. MARCILLE.
CHUCK.
(Application filed Sept. 12, 1898.)

(No Model.) 2 Sheets—Sheet 2.

Attest
Nora Graham
Ina Graham

INVENTOR
E. MARCILLE
by L. P. Graham
his attorney

THE NORRIS PETERS CO., PHOTO-LITHO., WASHINGTON, D. C.

UNITED STATES PATENT OFFICE.

EDWARD MARCILLE, OF DECATUR, ILLINOIS.

CHUCK.

SPECIFICATION forming part of Letters Patent No. 617,113, dated January 3, 1899.

Application filed September 12, 1898. Serial No. 690,725. (No model.)

*To all whom it may concern:*

Be it known that I, EDWARD MARCILLE, of the city of Decatur, county of Macon, and State of Illinois, have invented certain new and useful Improvements in Chucks, of which the following is a specification.

My invention relates to that class of chucks in which a pair of jaws are mounted one on each end of a right-and-left screw. It is exemplified in the structure hereinafter described and it is defined in the appended claims.

Figure 1:
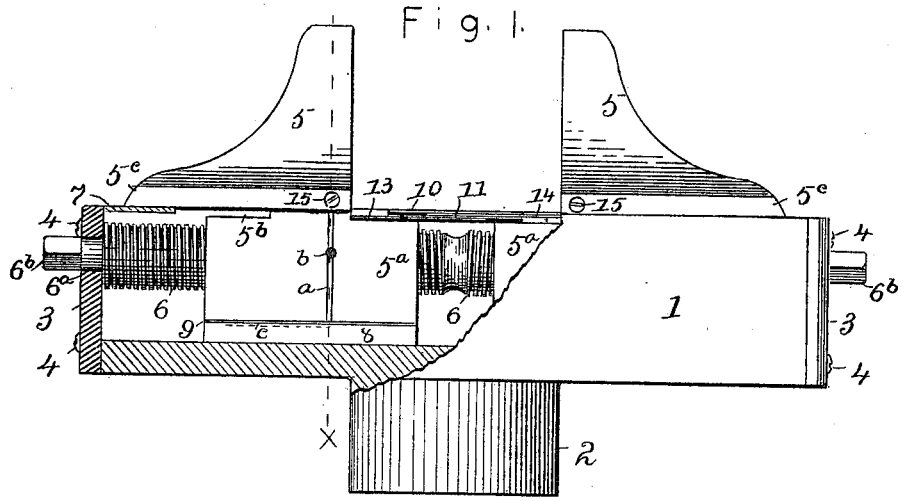
Figure 2:
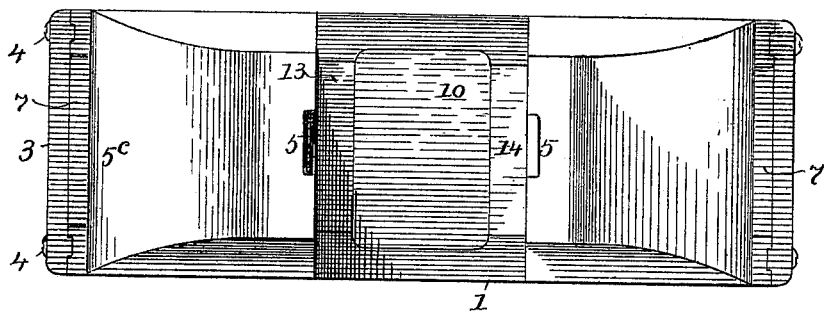
Figure 3:
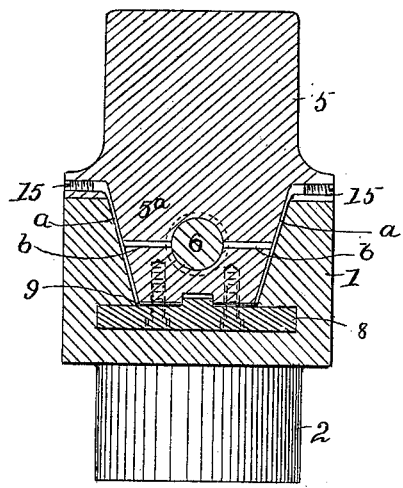
Figure 4:
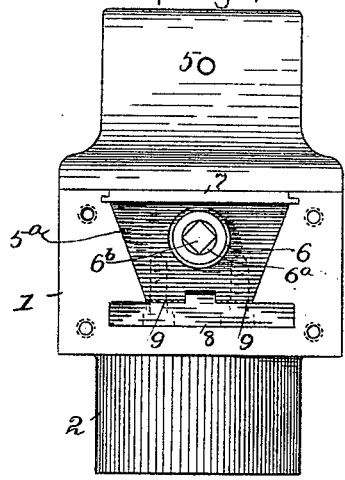
Figure 5:
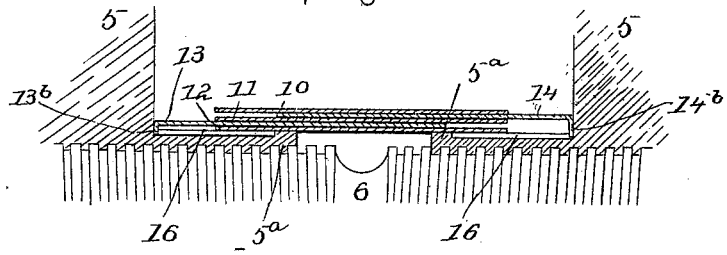
Figure 6:
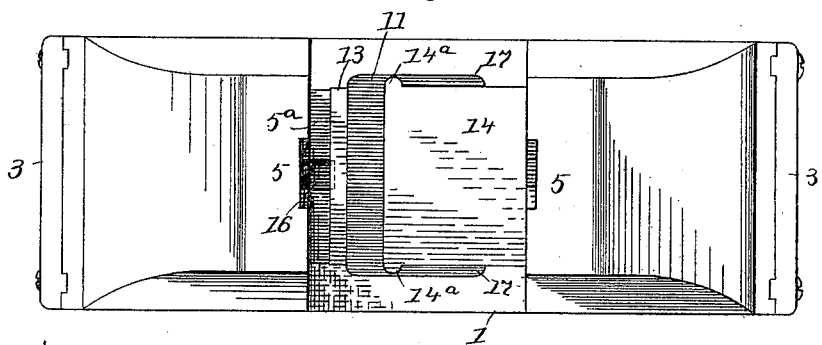

In the drawings forming part of this specification, Figure 1 is a side elevation of a chuck embodying my invention, a portion of the body being broken away to show details of internal construction. Fig. 2 is a plan of the chuck. Fig. 3 is a section on line $x$ in Fig. 1. Fig. 4 is an end view of the chuck with an end plate removed. Fig. 5 is an enlarged section lengthwise of a portion of the chuck. Fig. 6 is a plan of the chuck with a plate removed to expose details of a telescoping closure.

The screw 6 of the chuck has one half threaded right-handed and the other half left-handed. At the outer end of each threaded portion it has a diminished smooth circular bearing $6^a$, and its extremities $6^b$ are square or otherwise prismatic to form wrench-seats. The wrench-seats are no larger in greatest diameter than the diameter of the circular bearings $6^a$, for a reason that will hereinafter appear.

The jaws 5 have nut portions $5^a$, adapted to receive the threaded portions of the screw, one being a right-handed nut and the other a left-handed nut, and the sides of the nuts converge away from the jaws, as shown in Figs. 3 and 4. The nuts extend inward or toward each other beyond the inner faces of the jaws, while the jaws have bearings $5^c$, that extend outward beyond the nuts. Between the jaws proper and the nuts thereof are slots $5^b$, which aid in accomplishing a desirable result, to be hereinafter explained. To the lower or inner faces of the nuts are fastened slide-plates 8, which extend sidewise beyond the sides of the nuts, and between the slide-plates and the nuts are preferably placed a plurality of removable strips, as suggested at 9 in the drawings.

The body 1 of the chuck is recessed from end to end to conform to the converging nuts and the widened plates thereon. It has the customary internally-threaded boss 2 to engage the spindle of the lathe, and it is provided with end plates 3. The end plates are bored to receive the bearings $6^a$ of the screw, and they are fastened to the body 1 by means of screws 4 or other suitable fastening.

In assembling the jaws, the screw, and the body the jaws are placed in proper position on the screw. The slide-plates 8 are fastened to the nuts, as shown. The jaws and the screw are slid into position through an open end of the body, and the end plates 3 are fastened to the body, or the operation may be varied slightly by putting one of the end plates into position before sliding the jaws into the body.

A chuck so constructed has the advantage of long firm bearings for the jaws. The nuts of the jaws entirely encircle the screw and whenever the slide-bearings of the nuts wear compensation may be easily made by removing some of the surface of the nuts contiguous to the slide-plates 8. This may be done by filing or the like; but it is preferably accomplished by providing a plurality of thin intervening strips at 9 and simply removing one of them whenever the jaws become loosened by wear. When this is done and the plates 8 are drawn up against the nuts, the converging sides of the nuts will once more bear closely against the diverging surfaces of the body and a good fit will result; but without further provision the body would be open in places for the admission of chips and the like, and to prevent this is a part of the object of my invention. To close the body outside the jaws, I extend the jaws along the body some little distance, as shown at $5^c$, (which incidentally increases the length of bearing of the jaws on the body,) I slot the jaws in line with the outer surface of the body, as shown at $5^b$ in Fig. 1, and I set plates 7 into the ends of the body in position to enter the slots $5^b$ as the jaws are widely separated.

When the jaws are at their nearest approach, the extensions $5^c$ overlap the inner ends of plates 7 very little, and when the jaws are separated as far as possible the plates enter the slots $5^b$ to permit the necessary motion.

The means employed to close the space between the jaws comprises, as essential elements, a plate fixed to the body and extended across the opening and a plate connected with each of the jaws and disposed in slidable correlation with the plate of the body. This is the idea, simply expressed; but to get best results under all circumstances I prefer to amplify this somewhat and introduce the details shown in Fig. 5. In this case there are three separate plates 10, 11, and 12 connected together and to the body of the chuck. The connection is made by recessing the body on opposite sides of the opening, as shown at 17 in Fig. 6, and nesting the plates in such recesses. The slidable plates 13 and 14 are slightly narrower than the stationary plates, and they have side extensions, as $14^a$, on their inner ends, which act as stops against the end walls of the recesses. The slidable plates fit each between two of the stationary plates, so as to get a firmer guide-bearing, and they each have a downward extension, as $13^b$ and $14^b$, which enters a groove, as 16, in the outer surface of the inner end of a nut. As the jaws are separated the slidable plates may remain stationary until the stubs $13^b$ and $14^b$ engage the inner end wall of the grooves 16, when they will be carried outward with further motion of the jaws, or they may move out with the jaws until the side extensions, as $14^a$, engage the end walls of the recesses 17 and then remain stationary during the balance of the separating motion of the jaws; but in either case the closure-plates permit separating movement of the jaws approximately equal to the combined length of the two slots 16 and the two slidable plates 13 and 14, and this is more than is needed.

Having made provision for completely housing the screw and the sliding bearing of the jaws, I am enabled to supply oil to the bearings without bad effect, and I have devised the hereinafter-described means for easily and effectively distributing the lubricant.

In the sides of the jaws, near the inner or gripping sides thereof, I bore holes for the admission of oil and provide screws, as 15, to keep the holes normally closed. From the inner ends of the oil-holes I extend grooves, as $a$, downward along the converging surfaces of the nuts to the plates 8 and along the same outward, as shown in dotted lines at $c$ in Fig. 1, and from the grooves traversing the nuts I bore holes $b$ to the threads of the screw. Oil supplied to the screw-closed holes will reach the screw, the outer surfaces of the nuts, and the slide-plates. It will be supplied to the nuts and plates near the inner ends thereof and it will be effectually distributed by centrifugal action as the chuck rotates.

The jaws are set nearer together or farther apart by manipulating the protruding wrench-seats $6^b$ in the customary manner.

What I claim is—

1. In a chuck, the combination with a right-and-left screw, of jaws having nuts with converging sides, slide-plates fastened to the narrow sides of the nuts, such plates being wider than such narrow sides, and a body recessed from end to end to conform to the converging sides of the nuts and to the plates on the nuts, substantially as set forth.

2. In a chuck, the combination with a right-and-left screw, of jaws having nuts with converging sides, slide-plates fastened to the narrow sides of the nuts, such plates being wider than such narrow sides, a body recessed from end to end to conform to the converging sides of the nuts and to the plates on the nuts and end plates for the body, substantially as set forth.

3. In a chuck, the combination with a right-and-left screw, of jaws having nuts with converging sides, slide-plates fastened to the narrow sides of the nuts, removable strips between the plates and the nuts and a body recessed from end to end to conform to the converging sides of the nuts and to the plates on the nuts, substantially as set forth.

4. In a chuck, the combination with a right-and-left screw, of jaws having nuts adapted to the screw, a body having an open side to permit motion of the jaws, a stationary closure-plate between the jaws and slidable closure-plates lapping the stationary plate and connected one with each jaw, substantially as set forth.

5. In a chuck, the combination with a right-and-left screw, of jaws having nuts for the screw, a body having an opening to permit motion of the jaws, a stationary closure-plate between the jaws and plates connected slidably one with each of the jaws and both connecting slidably with the stationary plate, substantially as set forth.

6. In a chuck, the combination with a right-and-left screw, of jaws having nuts for the screw, a body open throughout its length to permit motion of the jaws, stationary closure-plates under outer extensions of the jaws, a stationary closure-plate between the jaws and slidable closure-plates lapping the stationary plates between the jaws and connected one with each jaw, substantially as set forth.

7. In a chuck, the combination with screw 6 and body 1, of jaws 5 having converging nuts on the screw and plates 8 attached to the nuts, the jaws having oil-passages entering near the inner ends thereof, extending along the walls of the nuts to the plates and diverting inward to the screw, substantially as set forth.

In testimony whereof I sign my name in the presence of two subscribing witnesses.

EDWARD MARCILLE.

Witnesses:
E. S. McDONALD,
DANIEL MYERS.